(12) United States Patent
Logounov (10) Patent No.: US 8,083,284 B1
(45) Date of Patent: Dec. 27, 2011

(54) TRACTOR AND TRAILER FAIRING APPARATUS

(76) Inventor: Nikolai Logounov, Sacramento, CA (US)

( * ) Notice: Subject to any disclaimer, the term of this patent is extended or adjusted under 35 U.S.C. 154(b) by 0 days.

(21) Appl. No.: 12/906,823

(22) Filed: Oct. 18, 2010

Related U.S. Application Data

(60) Provisional application No. 61/359,018, filed on Jun. 28, 2010.

(51) Int. Cl.
*B60J 7/00* (2006.01)
(52) U.S. Cl. ............... 296/180.2; 296/180.3; 296/180.4
(58) Field of Classification Search ............ 296/180.1, 296/180.2, 180.3, 180.4, 180.5
See application file for complete search history.

(56) References Cited

U.S. PATENT DOCUMENTS

| 3,834,752 | A | * | 9/1974 | Cook et al. | .............. 180/309 |
| D308,041 | S | | 5/1990 | Lund | |
| 5,658,038 | A | | 8/1997 | Griffin | |
| 6,428,084 | B1 | | 8/2002 | Liss | |
| 7,073,845 | B2 | | 7/2006 | Ortega et al. | |
| 7,971,918 | B2 | * | 7/2011 | Oriet et al. | ............. 296/26.09 |

* cited by examiner

*Primary Examiner* — Joseph Pape
(74) *Attorney, Agent, or Firm* — Crossley Patent Law; Mark A. Crossley (57) ABSTRACT

The tractor and trailer fairing apparatus providing a fairing of sorts that is fitted between the tractor and trailer. The apparatus side sections are automatically adjustable in length and can also be locked in a desired length. The second panel of the side sections and trailer towed by the tractor are fitted with a tracking assembly that sees the side panels follow the trailer during driving, whether straight or in turns, and ensuring that no wind enters the sides of the tractor/trailer union. Further, the optional telescopic spoiler prevents air entry from above. The apparatus not only prevents buffeting but also serves to increase fuel mileage.

3 Claims, 7 Drawing Sheets

TRACTOR AND TRAILER FAIRING APPARATUS

I claim benefit of my U.S. Provisional Patent Application No. 61359018 filed on Jun. 28, 2010.

BACKGROUND OF THE INVENTION

A problem exists with air entry and exit between a tractor and trailer, sometimes known as air swirl or backwash. The buffeting that exists between the tractor and trailer might even sometimes be termed "dirty air". No matter the term, this air problem causes greater resistance to travel, as air has mass, and consequently impinges upon fuel mileage and even hampers a truck in reaching and maintaining cruising speed. Anyone knowledgeable in tractor trailer fleet operation is further aware of the tremendous savings that can be had by increased fuel efficiency, even minor increase. Existing fairings in use, however small the benefits, are testimony to those savings. The present apparatus provides a solution to this problem.

FIELD OF THE INVENTION

The tractor and trailer fairing apparatus relates to tractors and trailers, often referred to as semi's, and more especially to a fairing apparatus that negates air swirl between a tractor and a trailer.

SUMMARY OF THE INVENTION

The general purpose of the tractor and trailer fairing apparatus, described subsequently in greater detail, is to provide a tractor and trailer fairing apparatus which has many novel features that result in an improved tractor and trailer fairing apparatus which is not anticipated, rendered obvious, suggested, or even implied by prior art, either alone or in combination thereof.

To attain this, the tractor and trailer fairing apparatus solves the above listed problems by providing a fairing of sorts that is fitted between the tractor and trailer. The apparatus side sections are automatically adjustable in length and can also be locked in a given length as chosen. The second panel of the side sections and trailer towed by the tractor are fitted with a tracking assembly that sees the side panels follow the trailer during driving, whether straight or in turns, and ensuring that no wind enters the sides of the tractor/trailer union. Further, the optional telescopic spoiler prevents air entry from above. The apparatus not only prevents buffeting but also serves to increase fuel mileage.

Thus has been broadly outlined the more important features of the improved tractor and trailer fairing apparatus so that the detailed description thereof that follows may be better understood and in order that the present contribution to the art may be better appreciated.

An object of the tractor and trailer fairing apparatus is to save fuel.

An object of the tractor and trailer fairing apparatus is to reduce aerodynamic drag of a tractor and trailer.

Another object of the tractor and trailer fairing apparatus is to improve tractor trailer handling.

A further object of the tractor and trailer fairing apparatus is to enclose the gap between a tractor and trailer.

Yet another object of the tractor and trailer fairing apparatus is to provide for movement between the tractor and trailer, while still fully functioning in straight progression and in turns.

An added object of the tractor and trailer fairing apparatus is to accommodate varied distances between a tractor and trailer.

These together with additional objects, features and advantages of the improved tractor and trailer fairing apparatus will be readily apparent to those of ordinary skill in the art upon reading the following detailed description of presently preferred, but nonetheless illustrative, embodiments of the improved tractor and trailer fairing apparatus when taken in conjunction with the accompanying drawings.

DETAILED DESCRIPTION OF THE DRAWINGS

With reference now to the drawings, and in particular FIGS. 1 through 11 thereof, the principles and concepts of the tractor and trailer fairing apparatus generally designated by the reference number 10 will be described.

Figure 2:
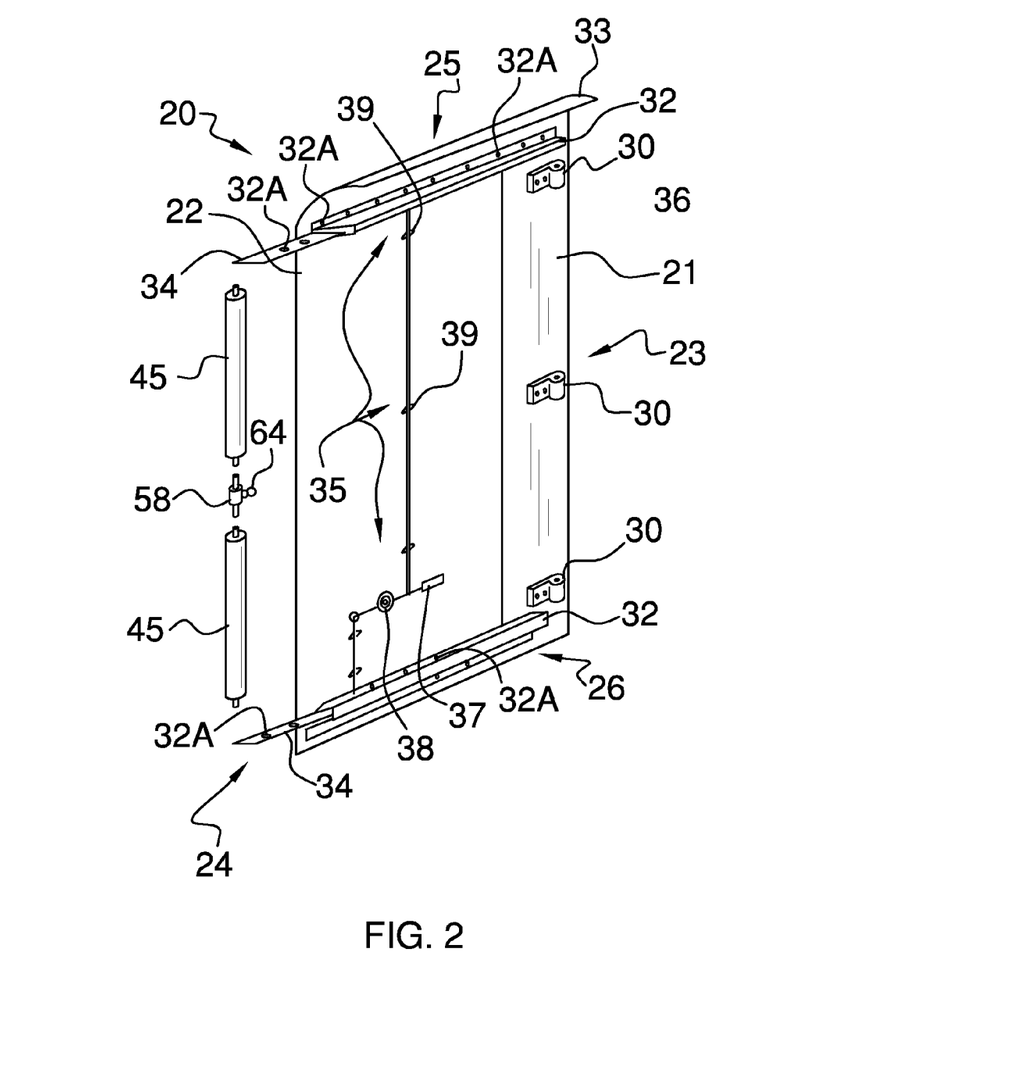
FIG. 2 is a interior perspective view of one side section.
Figure 3:
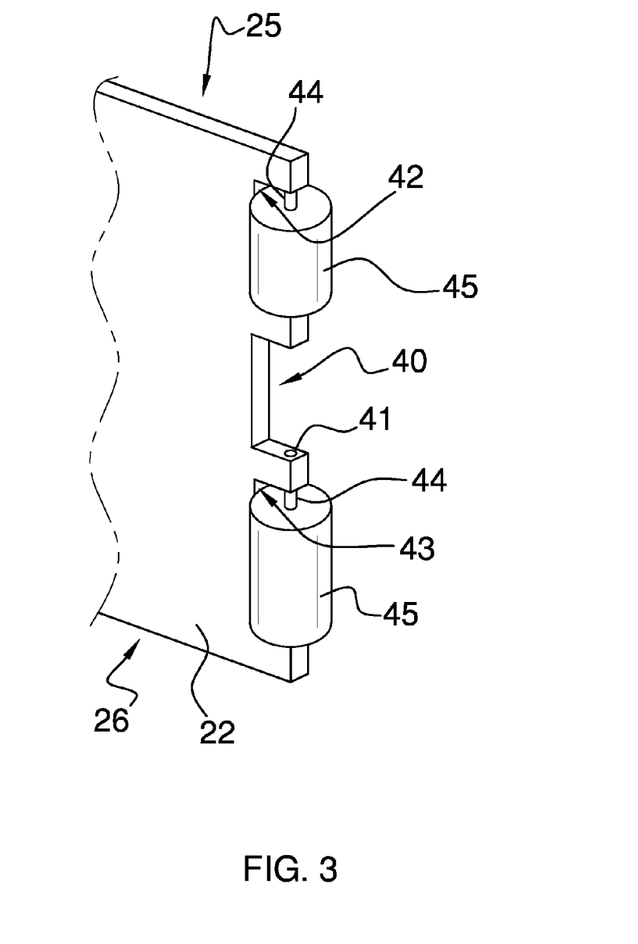
FIG. 3 is a rear partial perspective view of a second panel of one side section.

Referring to FIG. 2, the apparatus 10 partially comprises a pair of mirror image side sections 20. Each side section 20 has a front 23 spaced apart from a rear 24 and a top 25 spaced apart from a bottom 26. Each side section 20 further comprises a first panel 21 disposed vertically at the front 23.

Figure 1:
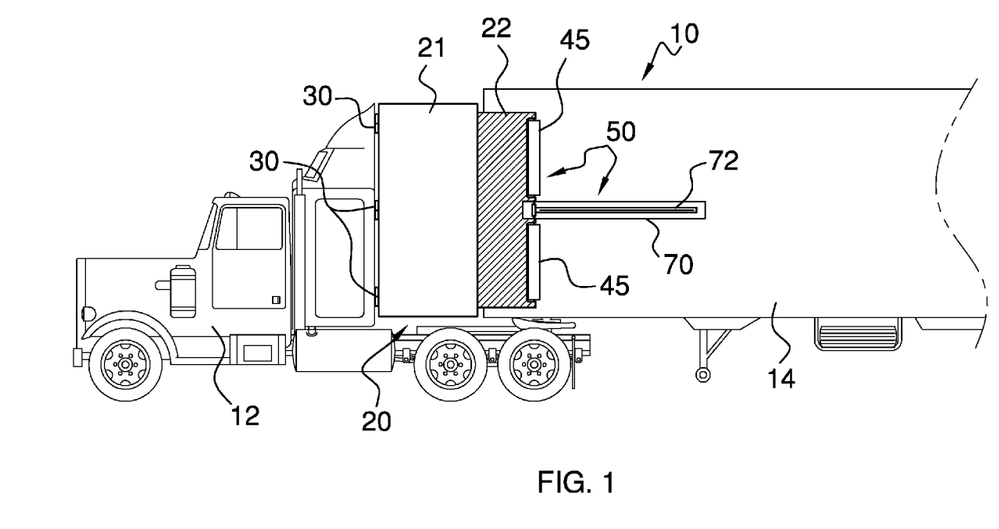
FIG. 1 is a lateral elevation view of the installed apparatus.

Continuing to refer to FIG. 2 and referring also to FIG. 1, the first panel 21 is affixed to an existing tractor 12 via a plurality of spaced apart hinges 30. The inwardly turned arc 33 is disposed horizontally atop of the first panel 21. A pair of spaced apart channels 32 is disposed horizontally on the first panel 21.

A plurality of spaced apart orifices 32A is disposed vertically within each channel 32. The second panel 22 is disposed vertically at the rear 24 of the side section 20. The pair of spaced apart slides 34 is disposed horizontally on the second panel 22. Each slide 34 is slideably engaged with one of each of the pair of channels 32. The second panel 22 is thereby slideably engaged with the first panel 21.

A panel lock mechanism 35 selectively locks the second panel 22 in a chosen position in relation to the first panel 21 regarding sliding engagement of the panels. The panel lock mechanism 35 comprises a lock rod 36 disposed vertically and interiorly to the second panel 22. A lock rod 36 is freely held adjacent to the second panel 22 by a plurality of spaced apart lock guides 39. A spring-loaded handle 37 with a lock spring 38 selectively engages and disengages the lock rod 36 from the first panel 21 channel 32 orifices 32A, whereby the second panel 22 is selectively positioned in relation to the first panel 21, Referring to FIG. 3, a plurality of spaced apart vertical slots is disposed within the second panel 22 rear 24. The slots comprise an upper slot 42 proximal to the top 25, a lower slot 43 proximal to the bottom 26, and the center slot 40 disposed between the upper slot 42 and the lower slot 43. The pair of identical spaced apart sockets 41 is disposed within the center slot 40. One socket 41 is disposed upwardly. One socket 41 is disposed downwardly. A vertical axle 44 is disposed within each of the upper slot 42 and the lower slot 43. A vertical roller 45 is rotateably disposed on each vertical axle 44.

Figures 6, 7:
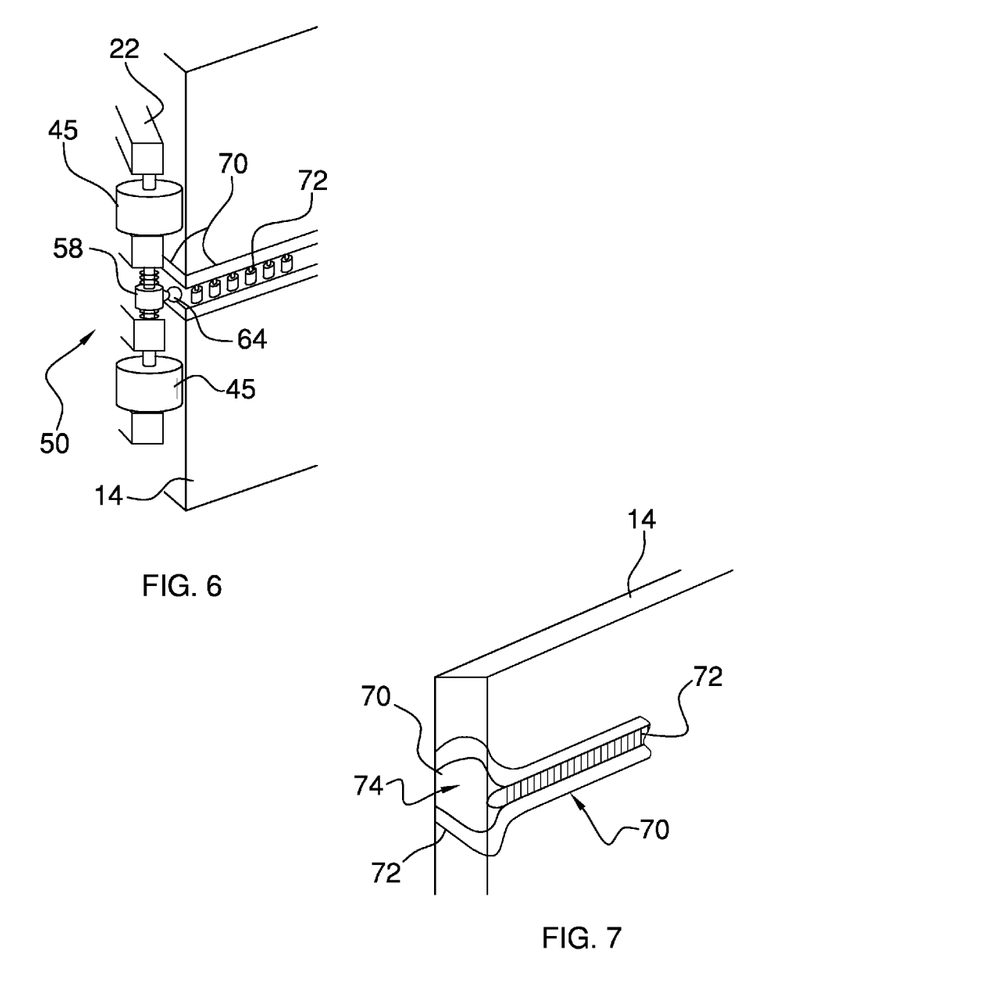
FIG. 6 is a partial perspective view of the tracking assembly engaged with the track.
FIG. 7 is a partial perspective view of the track with guide and flared opening.
Figure 8:
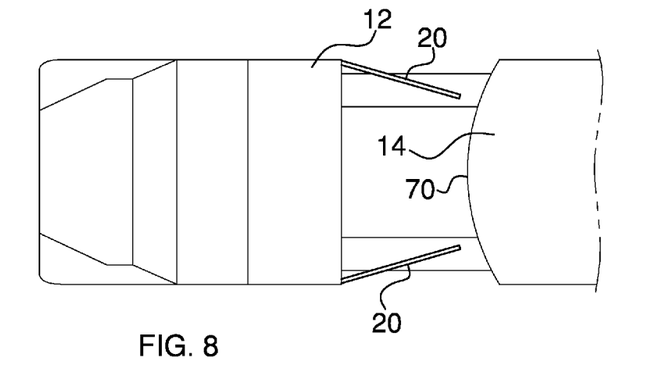
FIG. 8 is a top plan view of the track installed on a trailer.

Referring to FIGS. 1, 6, and 8, the tracking assembly 50 connects the second panels 22 of the side sections 20 to an existing trailer 14 pulled by the existing tractor 12.

Figure 4:
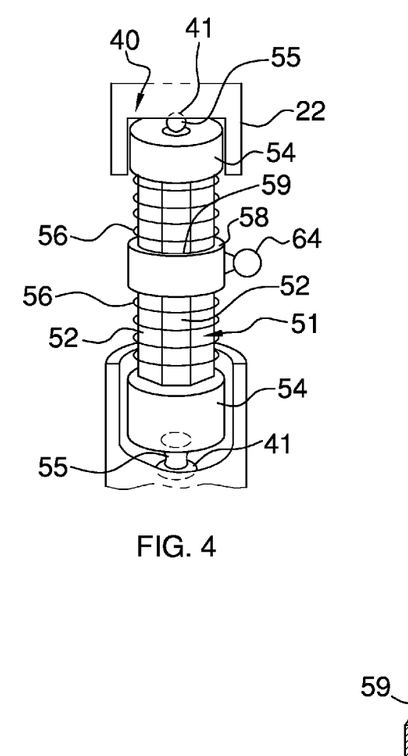
FIG. 4 is a rear partial perspective view of one second panel with shaft, sliding collar with ball lock, and accompanying components.
Figure 5:
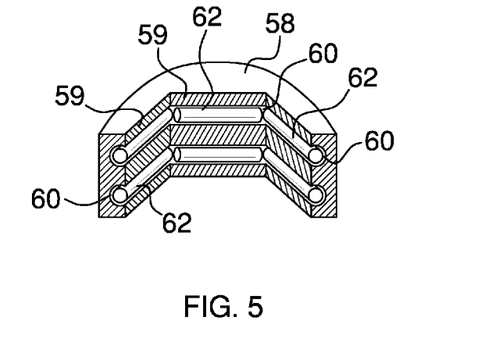
FIG. 5 is a partial cross section of FIG. 4.

Referring to FIGS. 4 and 5, the tracking assembly 50 partially comprises the hexagonal shaft 51 disposed vertically within each second panel 22 center slot 40. A cap 54 is disposed upwardly and downwardly on each shaft 51. A ball 55 is disposed outwardly on each cap 54. Each ball 55 is rotateably fitted within one of the pair of sockets 41 of the second panel 22 center slots 40. Each collar 58 has a sextet of interior sides 59. Each side 59 has a pair of spaced apart horizontally disposed needle bearings 62. Each interior side's 59 needle bearings 62 are slideably engaged with the hexagonal shaft 51. A pair of identical compression springs 56 is disposed on the hexagonal shaft 51. Each spring 56 pressures the collar 58 away from one of the pair of caps 54. A ball lock 64 is extended horizontally from the collar 58.

Referring to FIGS. 6 and 7, the track 70 is affixed to the existing trailer 14 front and a portion of each trailer 14 side. The guide 72 is disposed longitudinally throughout the track 70. A pair of spaced apart flared openings 74 is disposed within the track 70. The openings 74 are in communication with the guide 72. The ball locks of each second panel 22 are slideably engaged within the guide 72 of the track 70 by entering the flared openings 74.

Figure 9:
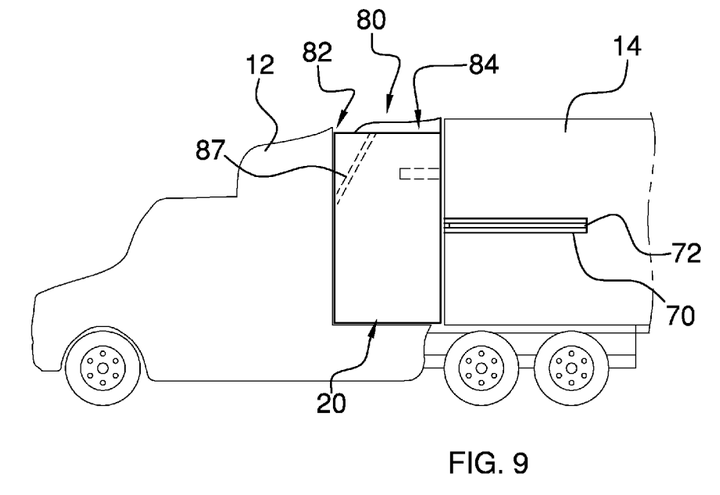
FIG. 9 is a lateral view of the installed apparatus.
Figure 10:
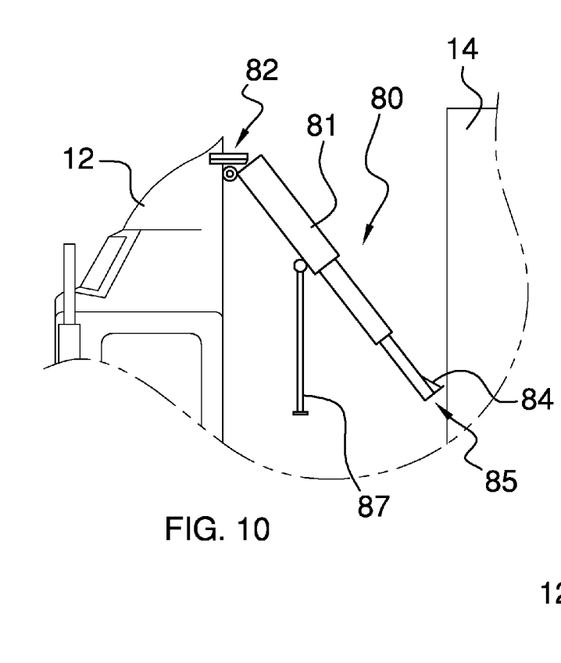
FIG. 10 is a lateral elevation view of the installed spoiler assembly in non-use position, with telescopic support.

Referring to FIGS. 9 and 10, the spoiler assembly 80 is in hinged sprung attachment to an upper rear of the existing tractor 12. The spoiler assembly 80 further comprises the telescopic spoiler 81. The upward flare 84 is disposed at a rear of the spoiler 81. The plurality of omnidirectional spoiler rollers 85 is disposed rearwardly in the upward flare 84. The spoiler rollers 85 are in communication with a front top of the existing trailer 14. The telescopic support 87 supports the spoiler 81 downwardly to the tractor 12 rear.

Figure 11:
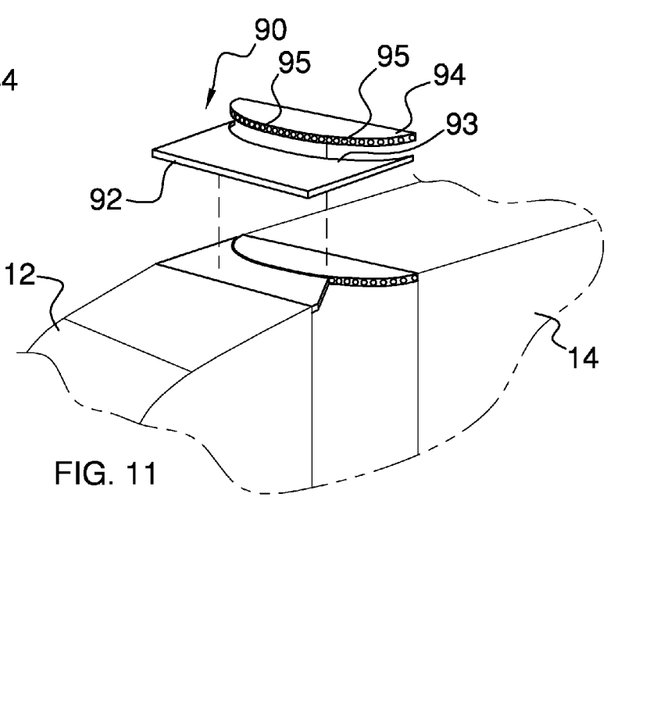
FIG. 11 is a perspective view of an alternate spoiler assembly.

Referring to FIG. 11, the alternate spoiler assembly 90 features a telescopic panel 92 attached horizontally to the rear of the existing tractor 12. The semicircular cutout 93 is disposed rearwardly in the telescopic panel 92. The matching trailer panel 94 is attached forwardly to the existing trailer 14. The plurality of rollers 95 is attached forwardly on the matching trailer panel 94. The rollers 95 are in communication with the telescopic panel 92 semicircular cutout 93.

What is claimed is:

1. A tractor and trailer fairing apparatus comprising, in combination:
   a pair of mirror image side sections having a front spaced apart from a rear, a top spaced apart from a bottom, each side section further comprising:
      a first panel disposed vertically at the front, the first panel affixed to an existing tractor via a plurality of spaced apart hinges;
      an inwardly turned arc disposed horizontally atop of the first panel;
      a pair of spaced apart channels disposed horizontally on the first panel;
      a plurality of spaced apart orifices disposed vertically within each channel;
      a second panel disposed vertically at the rear of the side section;
      a pair of spaced apart slides disposed horizontally on the second panel, each slide slideably engaged with one of each of the pair of channels, the second panel thereby slideably engaged with the first panel;
      a panel lock mechanism selectively locking the second panel in a chosen position in relation to the first panel, the panel lock mechanism comprising:
         a lock rod disposed vertically and interiorly to the second panel, the lock rod freely held adjacent to the second panel by a plurality of spaced apart lock guides;
         a spring-loaded handle selectively engaging and disengaging the lock rod from the first panel channel orifices, whereby the second panel is selectively positioned in relation to the first panel;
      a plurality of spaced apart vertical slots disposed within the second panel rear, the slots comprising an upper slot proximal to the top, a lower slot proximal to the bottom, and a center slot disposed between the upper slot and the lower slot;
      a pair of identical spaced apart sockets disposed within the center slot, one socket disposed upwardly, one socket disposed downwardly;
      a vertical axle disposed within each of the upper slot and the lower slot;
      a vertical roller rotateably disposed on each vertical axle;
   a tracking assembly connecting the second panels of the side sections to an existing trailer pulled by the existing tractor, the tracking assembly comprising:
      a hexagonal shaft disposed vertically within each second panel center slot;
      a cap disposed upwardly and downwardly on each shaft;
      a ball disposed outwardly on each cap, each ball rotateably fitted within one of the pair of sockets of the second panel center slots;
      a collar having a sextet of interior sides, each side having a pair of spaced apart horizontally disposed needle bearings, each interior side's needle bearings slideably engaged with the hexagonal shaft;
      a pair of identical compression springs disposed on the hexagonal shaft, each spring pressuring the collar away from one of the pair of caps;
      a ball lock extended horizontally from the collar;
      a track affixed to the existing trailer front and a portion of each trailer side;
      a guide disposed longitudinally throughout the track;
      a pair of spaced apart flared openings disposed within the track, the openings in communication with the guide;
   whereby the ball locks of each second panel are slideably engaged within the guide of the track.

2. A tractor and trailer fairing apparatus comprising, in combination:
   a pair of mirror image side sections having a front spaced apart from a rear, a top spaced apart from a bottom, each side section further comprising:
      a first panel disposed vertically at the front, the first panel affixed to an existing tractor via a plurality of spaced apart hinges;
      an inwardly turned arc disposed horizontally atop of the first panel;
      a pair of spaced apart channels disposed horizontally on the first panel;

a plurality of spaced apart orifices disposed vertically within each channel;

a second panel disposed vertically at the rear of the side section;

a pair of spaced apart slides disposed horizontally on the second panel, each slide slideably engaged with one of each of the pair of channels, the second panel thereby slideably engaged with the first panel;

a panel lock mechanism selectively locking the second panel in a chosen position in relation to the first panel, the panel lock mechanism comprising:

a lock rod disposed vertically and interiorly to the second panel, the lock rod freely held adjacent to the second panel by a plurality of spaced apart lock guides;

a spring-loaded handle selectively engaging and disengaging the lock rod from the first panel channel orifices, whereby the second panel is selectively positioned in relation to the first panel;

a plurality of spaced apart vertical slots disposed within the second panel rear, the slots comprising an upper slot proximal to the top, a lower slot proximal to the bottom, and a center slot disposed between the upper slot and the lower slot;

a pair of identical spaced apart sockets disposed within the center slot, one socket disposed upwardly, one socket disposed downwardly;

a vertical axle disposed within each of the upper slot and the lower slot;

a vertical roller rotateably disposed on each vertical axle;

a tracking assembly connecting the second panels of the side sections to an existing trailer pulled by the existing tractor, the tracking assembly comprising:

a hexagonal shaft disposed vertically within each second panel center slot;

a cap disposed upwardly and downwardly on each shaft;

a ball disposed outwardly on each cap, each ball rotateably fitted within one of the pair of sockets of the second panel center slots;

a collar having a sextet of interior sides, each side having a pair of spaced apart horizontally disposed needle bearings, each interior side's needle bearings slideably engaged with the hexagonal shaft;

a pair of identical compression springs disposed on the hexagonal shaft, each spring pressuring the collar away from one of the pair of caps;

a ball lock extended horizontally from the collar;

a track affixed to the existing trailer front and a portion of each trailer side;

a guide disposed longitudinally throughout the track;

a pair of spaced apart flared openings disposed within the track, the openings in communication with the guide;

whereby the ball locks of each second panel are slideably engaged within the guide of the track;

a spoiler assembly in hinged sprung attachment to an upper rear of the existing tractor, the spoiler assembly further comprising:

a telescopic spoiler;

an upward flare disposed at a rear of the spoiler;

a plurality of omnidirectional spoiler rollers disposed rearwardly in the upward flare, the spoiler rollers in communication with a front top of the existing trailer;

a telescopic support supporting the spoiler downwardly to the tractor rear.

3. A tractor and trailer fairing apparatus comprising, in combination:

a pair of mirror image side sections having a front spaced apart from a rear, a top spaced apart from a bottom, each side section further comprising:

a first panel disposed vertically at the front, the first panel affixed to an existing tractor via a plurality of spaced apart hinges;

an inwardly turned arc disposed horizontally atop of the first panel;

a pair of spaced apart channels disposed horizontally on the first panel;

a plurality of spaced apart orifices disposed vertically within each channel;

a second panel disposed vertically at the rear of the side section;

a pair of spaced apart slides disposed horizontally on the second panel, each slide slideably engaged with one of each of the pair of channels, the second panel thereby slideably engaged with the first panel;

a panel lock mechanism selectively locking the second panel in a chosen position in relation to the first panel, the panel lock mechanism comprising:

a lock rod disposed vertically and interiorly to the second panel, the lock rod freely held adjacent to the second panel by a plurality of spaced apart lock guides;

a spring-loaded handle selectively engaging and disengaging the lock rod from the first panel channel orifices, whereby the second panel is selectively positioned in relation to the first panel;

a plurality of spaced apart vertical slots disposed within the second panel rear, the slots comprising an upper slot proximal to the top, a lower slot proximal to the bottom, and a center slot disposed between the upper slot and the lower slot;

a pair of identical spaced apart sockets disposed within the center slot, one socket disposed upwardly, one socket disposed downwardly;

a vertical axle disposed within each of the upper slot and the lower slot;

a vertical roller rotateably disposed on each vertical axle;

a tracking assembly connecting the second panels of the side sections to an existing trailer pulled by the existing tractor, the tracking assembly comprising:

a hexagonal shaft disposed vertically within each second panel center slot;

a cap disposed upwardly and downwardly on each shaft;

a ball disposed outwardly on each cap, each ball rotateably fitted within one of the pair of sockets of the second panel center slots;

a collar having a sextet of interior sides, each side having a pair of spaced apart horizontally disposed needle bearings, each interior side's needle bearings slideably engaged with the hexagonal shaft;

a pair of identical compression springs disposed on the hexagonal shaft, each spring pressuring the collar away from one of the pair of caps;

a ball lock extended horizontally from the collar;

a track affixed to the existing trailer front and a portion of each trailer side;

a guide disposed longitudinally throughout the track;

a pair of spaced apart flared openings disposed within the track, the openings in communication with the guide;

whereby the ball locks of each second panel are slideably engaged within the guide of the track;
a spoiler assembly having a telescopic panel attached horizontally to the rear of the existing tractor;
a semicircular cutout disposed rearwardly in the telescopic panel;
a matching trailer panel attached to the existing trailer;
a plurality of rollers attached forwardly on the matching trailer panel, the rollers in communication with the telescopic panel semicircular cutout.

* * * * *